No. 778,058. PATENTED DEC. 20, 1904.
J. MILLAR.
LAND MARKER.
APPLICATION FILED MAY 16, 1903.
NO MODEL. 2 SHEETS—SHEET 1.

Witnesses: James Millar, Inventor,
By Marion & Marion
Attorneys

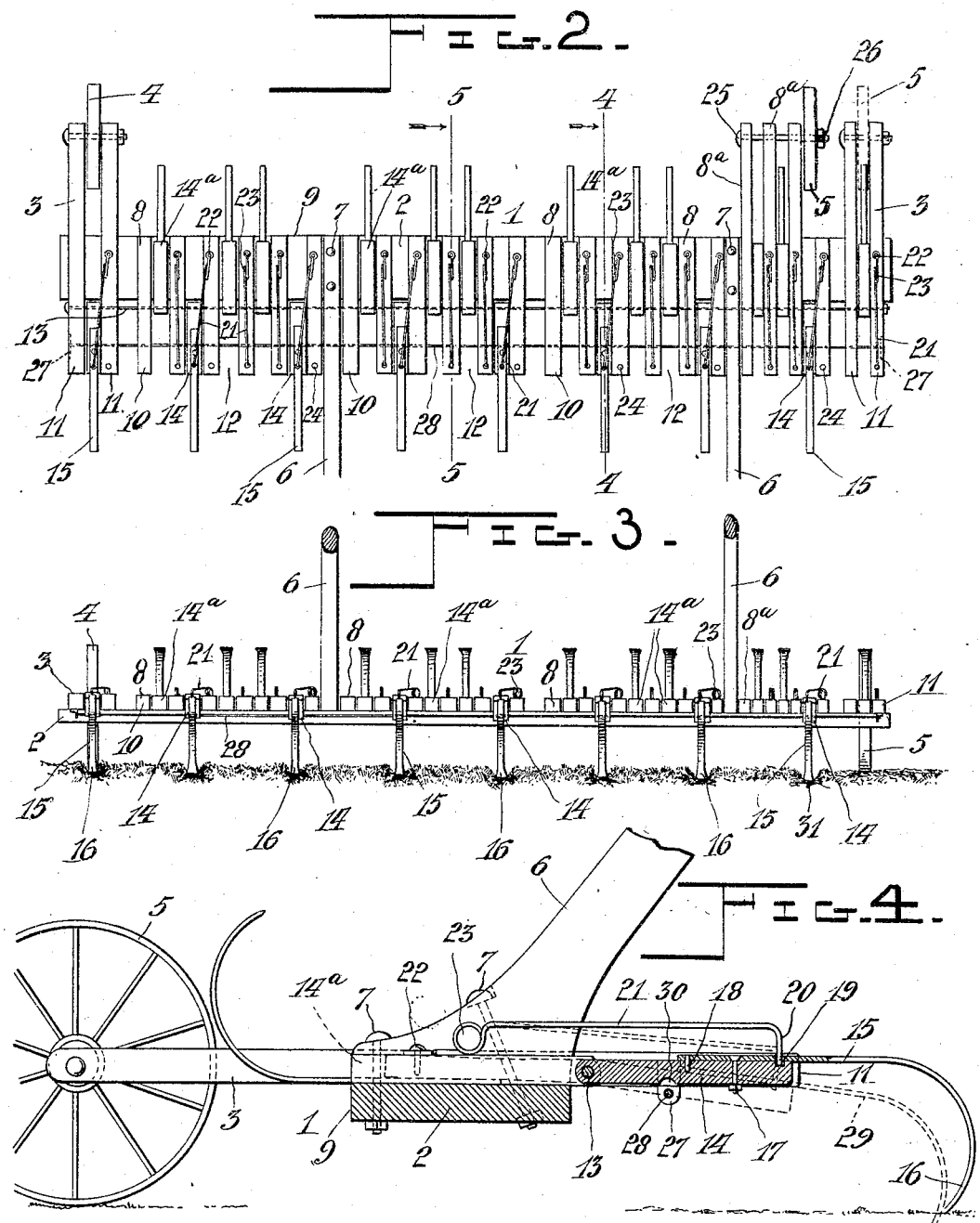

No. 778,058.

Patented December 20, 1904.

UNITED STATES PATENT OFFICE.

JAMES MILLAR, OF LYN, CANADA.

LAND-MARKER.

SPECIFICATION forming part of Letters Patent No. 778,058, dated December 20, 1904.

Application filed May 16, 1903. Serial No. 157,386.

*To all whom it may concern:*

Be it known that I, JAMES MILLAR, a subject of the King of Great Britain, residing at Lyn, county of Leeds, Province of Ontario, Canada, have invented certain new and useful Improvements in Land-Markers; and I do hereby declare that the following is a full, clear, and exact description of the invention, such as will enable others skilled in the art to which it appertains to make and use the same.

My invention relates to land-markers and implements of the same class which are intended for the purpose of laying off a properly-tilled field into rows for the purpose of planting seeds. The implement is intended especially to be used before planting strawberries, corn, or similar seeds.

The object of the invention is to save the very considerable labor which is now entailed in laying off a field in the manner suggested, and is especially valuable where the seeds are to be planted in rows which are quite close together. To this end arrangement is made whereby a plurality of furrows may be formed simultaneously by the implement.

In its general construction the invention comprises a frame having its width disposed transversely to the direction in which the implement is advanced, said frame being provided with a plurality of teeth which are adapted to scratch or furrow the ground as the implement passes. Improved arrangement is made for adapting the implement for forming furrows at different distances apart, as may be desired, and for facilitating proper guiding of the implement as it is advanced, whereby the furrows laid out by it will be regular in form. Improved arrangement is made for facing the teeth toward the earth and for facilitating the advance of the implement in such a manner as to hold the teeth out of operative relation with the earth.

The invention consists in the construction and combination of parts to be more fully described hereinafter and definitely set forth in claims.

Figure 1:
Figure 5:
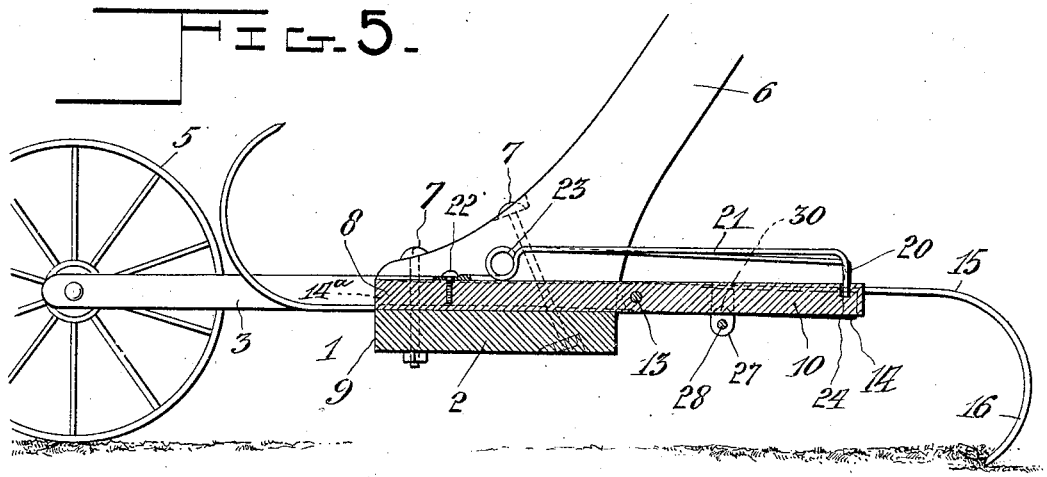

In the drawings, which fully illustrate my invention, Figure 1 is a perspective showing its actual operation in the field. Fig. 2 is a plan of the implement, the operating-handles being broken away, as will appear. Fig. 3 is a rear elevation of the implement, the operating-handles being shown in section. Fig. 4 is a longitudinal vertical section of the implement, taken on line 4 4 on Fig. 2, passing through a portion of one of the aforesaid teeth, a part being shown in elevation. This view also shows in dotted-line position the relation which the parts may assume when the implement is being pushed idly. Fig. 5 is a longitudinal vertical section somewhat similar to that shown in Fig. 4; but this section is taken at a point between two teeth, differing in this respect from Fig. 4.

Throughout the drawings and specification similar numerals of reference denote like parts.

Referring more particularly to the parts, 1 represents the frame of the implement, which comprises a transversely-disposed body or board 2, near the extremities of which are attached forwardly-projecting wheel-forks 3, between which are mounted, respectively, wheels 4 and 5 in the manner shown. A pair of operating-handles 6 are attached, by means of suitable bolts 7, to the upper side of the member 2, and these handles incline upwardly and rearwardly, as indicated in Fig. 1. The transverse member 2 is provided on its upper side with a plurality of bars or distance-pieces 8, which project rearwardly from member 2 in the manner indicated, their forward extremities being in substantial alinement with the forward edge 9 of the member 2. Their rear extremities 10 are all substantially in alinement with each other and are also in alinement with the rear extremities 11 of the aforesaid forks 3, which forks project rearwardly from the member 2 in the same manner as the bars 8. It should be observed that in this manner the body of the board 2 is divided into a plurality or series of spaces 12, of substantially equal width, and it will be observed that the aforesaid handles 6 occupy a part of this space.

Just to the rear of the rear edge of the member 2 there is provided a bar 13, which extends longitudinally with respect to the said member 2 and transversely of the implement, passing successively through the aforesaid bars 8. Upon this bar 13 there are pivoted in the spaces 12 a plurality of arms 14, to the upper sides of which (when in their normal position) there are attached, respectively, spring-teeth 15. These teeth are preferably substantially of the form shown, having the usual curved or hooked points 16 at the rear, which points are adapted to dig into the ground and produce a furrow in the usual manner. These spring-teeth are attached to the arms 14 by means of bolts 17 and dowel-pins 18, which coöperate with said bolts to prevent the teeth from moving laterally upon their arms. Upon their upper sides as viewed in Fig. 4 each tooth 15, together with its corresponding arm, is provided with a recess 19, and this recess is adapted to receive a downward extension or finger 20, which is formed upon the spring 21, there being a plurality of these springs 21, which correspond, respectively, to the different spring-teeth. They are attached, as shown, by pivot-bolts 22 to the upper sides of the aforesaid bars 8 and are formed with coils 23, as shown. The rear extremities of the bars 8 are provided with openings or recesses 24, which are substantially similar to the aforesaid recesses 19 and which are adapted to receive the fingers 20 in the same manner and for a purpose which will appear hereinafter.

It will be observed from an inspection of Fig. 2 that certain of the arms 14—viz., those indicated by 14$^a$—are represented as thrown into a reverse position, so that they project forwardly instead of rearwardly from bar 13. It will appear that in this position they lie idly upon the upper side of the member 2, and when in this position evidently the spring-teeth which they carry are thrown into an inoperative position. It should be stated that in order to throw the arms 14$^a$ into the position in which they are represented the aforesaid springs 21 are lifted out of the recesses 19, and the fingers 20 are then placed in the recesses 24 in the manner indicated. In this way the springs are suitably provided for when not in operative relation with the arms 14. It should be understood that in practice the possibility of throwing back the arms 14 in the manner described enables furrows to be produced at different distances apart, according to the spacing or arrangement of the operative members of the spring-teeth, it being understood that a sufficient number of arms may be thrown back at the necessary points, so as to bring about an equal spacing or distance between the operative teeth, as will be readily understood. In this manner upon a practically-constructed implement the spacing between the furrows may be made six inches, twelve inches, eighteen inches, twenty-four inches, &c., as desired.

It should be observed that the wheel 4 aforesaid runs directly in front of that spring-tooth which is at the extreme left of the implement. This arrangement is very convenient and at the same time affords means for facilitating the regular and accurate laying off of the rows or furrows in a manner which will be described hereinafter. It is desirable, too, that a similar arrangement should be adopted at the right of the implement—namely, that wheel 5 should run directly in advance of that tooth which is located at the extreme right of the implement—and as the tooth at the extreme right may be a different tooth according to the arrangement of the spacing between the operative teeth of the implement arrangement is made for mounting the wheel 5 in different positions. To this end certain of the bars 8, which are indicated specifically by the numeral 8$^a$, project forwardly in the manner shown, so that these bars 8$^a$ are substantially similar in construction to the aforesaid forks 3. It should be observed that there are three of these bars or forks 8$^a$, and it will be seen that they carry the transverse removable bolt 25, which has a projecting extremity 26, upon which the wheel 5 may be mounted in the manner indicated. It is of course understood that the dotted outline 5 in Fig. 2 represents the position the wheel occupies when the spacing of the rows is such as to make the tooth at the extreme right the last tooth that makes the furrow.

To the outermost of the forks 3 near their rear extremities there are provided a pair of oppositely-disposed ears 27, between which is mounted a rest 28, consisting of a bar, as shown, disposed transversely of the implement below the bars 8. From this arrangement it should appear that if the frame of the implement were tilted forwardly upon the wheels, so as to lift the spring-teeth clear of the ground, they would move downwardly by gravity until they occupied the position with respect to the frame such as that indicated in dotted outline 29 in Fig. 4, being supported in this position by the aforesaid rest 28. The arms 14 may be provided upon their under sides with recesses 30, which are adapted to receive the said rest 28 in the manner indicated.

In the practical operation of the implement in laying off the furrows it should be understood that a straight guiding-line would first be laid off at one side of the field. With this line as a guide the implement would be pushed across the field in the manner indicated in Fig. 1, so that the wheel 4 would run over the guiding-line. In returning the wheel 5 would be made to run over the furrow 31, which is the outermost furrow formed in the preceding trip of the implement. In this manner the field will be laid off into a plurality of regular rows regularly spaced. If it is desired to lay off the field in another direction also, steps are taken similar to those just described. It should be understood that where it is desired to turn the implement at the end of each trip the handles are tilted forwardly in the manner described, so as to raise the teeth out of the ground. With the teeth in this raised position also the implement would be wheeled to and from the field.

While I have shown in the accompanying drawings the preferred form of my invention, it will be understood that I do not limit myself to the precise form shown, for many of the details may be changed in form or position without affecting the operativeness or utility of my invention.

What I claim, and desire to secure by Letters Patent, is—

1. In an implement of the class described, a frame comprising a transverse beam, wheels adapted to support the same, a plurality of teeth projecting rearwardly from said beam, pivoted springs normally adapted to hold said teeth in operative position, said springs being adapted for disengagement from said teeth, whereby said teeth may be thrown back into inoperative position.

2. In an implement of the class described, in combination, a frame comprising a transverse beam, a plurality of arms pivotally mounted thereupon and projecting rearwardly therefrom, said arms having teeth, wheels supporting said frame, said arms having recesses, springs adapted to be received by said recesses to maintain said arms in operative position, said springs being adapted for removal from said recesses, whereby said arms may be thrown into an inoperative position.

3. In an implement of the class described, in combination, a frame comprising a transverse beam, a plurality of pivoted arms projecting rearwardly from said beam, said arms having teeth and recesses, springs adapted to be received by said recesses to maintain said arms in operative position, said springs being pivotally mounted whereby they may be disengaged from said recesses and moved on their pivots and means for maintaining said springs in an inoperative position.

4. In an implement of the class described, in combination, a frame having a transverse beam, a pivot-bar carried by said frame and disposed longitudinally with respect to said beam, a plurality of arms pivotally mounted on said pivot-bar, teeth carried thereby, said arms having recesses, springs mounted adjacent to said arms, the extremities whereof are received by said recesses, there being other recesses adapted to receive the extremities of said springs, said springs being pivoted whereby they may be moved between said recesses.

5. In an implement of the class described, the combination comprising a frame, a plurality of bars carried thereby and projecting therefrom, a plurality of arms carried between said bars, removable springs attached to said bars and holding said arms in operative position, teeth carried by said arms and means to permit the reversing of said arms and maintaining said arms in reversed position.

6. In an implement of the character described, in combination, a frame comprising a transversely-disposed beam, a plurality of bars carried thereby and projecting therefrom, a pivot-bar passing through said bars, a plurality of arms pivotally mounted upon said pivot-bar, springs carried adjacent to said arms by said bars and constructed to hold said bars in operative position, means for disengaging said springs from said arms, means for maintaining said springs in their disengaged position, and means for reversing said arms from an operative to an inoperative position and maintaining them in said last position.

7. In an implement of the class described, in combination, a frame comprising a transverse beam, wheels supporting the same, a plurality of bars carried by said beam and projecting rearwardly therefrom, a pivot-bar carried by said bars to the rear of said beam, a plurality of arms pivotally mounted on said pivot-bar and normally adapted to project rearwardly from said beam, said arms having recesses, springs adjacent to said arms the extremities whereof are received by said recesses, said springs being pivoted and said arms having recesses which may receive the extremities of said springs.

8. In an implement of the character described, the combination comprising a frame, wheels supporting the frame, a plurality of pivotally-mounted arms projecting from said frame and carrying teeth, means for forcing said arms downward, a bar disposed transversely of said implement beneath said arms, a rest adapted to support said arms when the frame of said implement is raised to disengage the said teeth from the earth, and means for reversing and maintaining said arms in reversed position.

9. In an implement of the class described, in combination, a frame, bars carried thereby at the sides thereof, wheels carried by said bars, other bars disposed upon said frame between said first bars, teeth pivotally mounted between said bars, a pair of said teeth being in alinement with said wheels and means for maintaining one of said wheels between the bars adjacent the bars at the sides of the frame whereby said wheel may be alined with other teeth.

10. In an implement of the class described, in combination, a frame comprising a transverse beam, bars at the extremities of said beam projecting forwardly and rearwardly therefrom, wheels carried by said bars forwardly of said beam, teeth carried by said bars rearwardly of said beam, other bars and other teeth carried by said first bars, and projecting forwardly from said beam and constituting means for supporting one of said wheels.

11. In an implement of the class described, in combination, a frame comprising a transverse beam, a wheel, means for supporting said wheel near one extremity of said beam, a second wheel, means for supporting said second wheel upon said frame at a plurality of points laterally disposed with respect to said implement, a plurality of teeth carried by said beam in an operative and inoperative position, and said wheels normally alining with a pair of said teeth.

12. In an implement of the class described, in combination, a frame, bars carried thereby and projecting rearwardly therefrom, wheels supporting said frame, a pivot-bar passing through said bars, a plurality of arms pivotally mounted upon said pivot-bar, teeth carried by said arms, springs holding said arms so that said teeth are forced toward the ground, a transversely-disposed bar constituting a stop to limit the downward movement of said teeth, means for reversing the position of said arms and means for positively maintaining them in reversed position.

In witness whereof I have hereunto set my hand in the presence of two witnesses.

JAMES MILLAR.

Witnesses:
H. A. STEWART,
P. J. DRIVER.